R. E. HELLMUND.
PHASE CONVERTING SYSTEM WITH INHERENT BALANCING MEANS.
APPLICATION FILED AUG. 11, 1917.

1,323,271.
Patented Dec. 2, 1919.
7 SHEETS—SHEET 5.

Fig. 6.

WITNESSES:
F. A. Lind.
D. C. Davis.

INVENTOR
Rudolf E. Hellmund
BY
ATTORNEY

R. E. HELLMUND.
PHASE CONVERTING SYSTEM WITH INHERENT BALANCING MEANS.
APPLICATION FILED AUG. 11, 1917.

1,323,271.

Patented Dec. 2, 1919.
7 SHEETS—SHEET 7.

Fig. 10

WITNESSES:
Fred. C. Kilharm
D. C. Davis

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

PHASE-CONVERTING SYSTEM WITH INHERENT BALANCING MEANS.

1,323,271. Specification of Letters Patent. Patented Dec. 2, 1919.

Application filed August 11, 1917. Serial No. 185,696.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Phase - Converting Systems with Inherent Balancing Means, of which the following is a specification.

My invention relates to phase-converting systems of the general type wherein energy is transferred from a single-phase circuit to a polyphase circuit through the agency of a dynamo-electric machine, and it has for its object to provide a system of the character designated wherein means are provided for inherently maintaining a substantial balance in the different phases of the polyphase circuit throughout wide changes in the load and resultant variations in the ohmic and inductive drops within the phase-converter, said drops normally tending to produce unbalance.

In the accompanying drawings, Figures 1, 3, 5 and 7 to 10, inclusive, are diagrammatic views of different forms of phase-converting systems embodying my invention.

In the production of polyphase electromotive forces, particularly three-phase electromotive forces, from a single-phase source, through the instrumentality of a phase-converter, it is usual to supply one of the delta electromotive forces of the polyphase circuit either directly from the single-phase source or through a transformer, so that said delta electromotive force is either in phase or in phase opposition to the electromotive force of the source. The two remaining delta electromotive forces of the polyphase circuit are determined, in phase and in magnitude, by the phase-converter, and their phase and magnitude are thus subject to change because of the ohmic and inductive drops within the converter, the effect of said drops being to distort and unbalance the delta voltages under load unless proper compensating means are provided therefor.

In the subjoined discussion and description, I shall refer to the delta electromotive force which is in phase or in phase opposition to the single-phase electromotive force as the "B" electromotive force or phase. In like manner, I shall designate that electromotive force or phase of the polyphase circuit which immediately leads the "B" phase as the "A" phase and I shall further designate that delta electromotive force or phase which immediately follows the "B" phase as the "C" electromotive force or phase.

In U. S. Patents Nos. 1,242,936 and 1,242,937, issued to the Westinghouse Electric & Manufacturing Company on Oct. 16, 1917, on applications filed by myself, I have disclosed a method of, and apparatus for, securing phase balance in a system of the character designated by means of mutual interlinkage of the supply leads of the A and C phases through reactance devices of equal size and the production of similar effects by the insertion of inductive devices of equal reactance in the supply mains of the A and C phases.

In U. S. Patents Nos. 1,249,782 and 1,249,783, issued Dec. 11, 1917, on applications filed by R. R. Lawrence, and assigned to the Westinghouse Electric & Manufacturing Company, are described and claimed similar systems wherein the A and C phases are arranged to develop balancing or corrective electromotive forces by the insertion of reactive devices therein or by producing a loose magnetic coupling therebetween, as by the use of a leakage transformer.

In my copending application, Serial No. 178,549, filed July 5, 1917, I disclose means wherein a more nearly perfect balancing effect throughout the entire range of current adjustment, from full-load recuperation to 100% motoring in the polyphase circuit, may be obtained by the use of inductive devices of unequal size in the different leads of the phase-converting system.

In the system of this application, I inductively interlink certain leads of the converter system by means of transformers having other than a 1 to 1 ratio and I may or may not insert additional reactive devices in the same or in other leads in order to still more closely attain to the desired balanced condition. By this means, the displacement of one corner of the electromotive force triangle of the polyphase circuit, brought about by the ohmic and inductive drop within the converter, is accompanied by appropriate displacement of the remaining corners of the polyphase electromotive force triangle.

Figure 1:
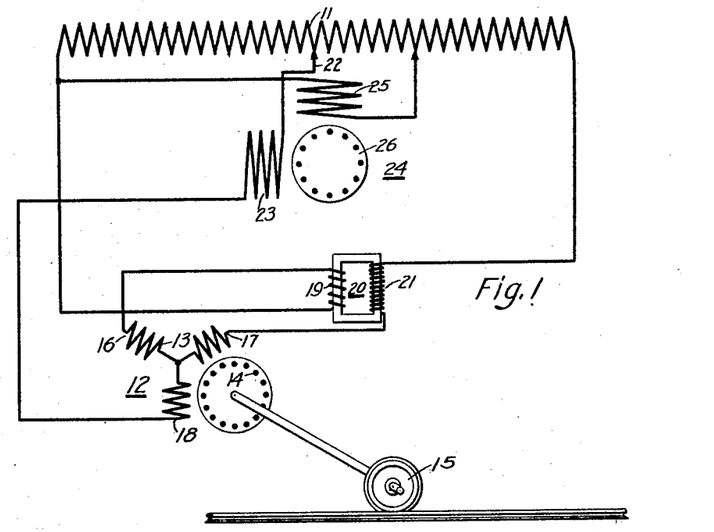

Referring to the drawing for a more detailed understanding of my invention, I show a source of single-phase electromotive force, such, for example, as a transformer winding, at 11 in Fig. 1. Said source is arranged to transfer energy to or to receive energy from a polyphase circuit shown as comprising a three-phase induction machine 12 embodying a star-connected primary member 13 and a squirrel-cage rotor secondary member 14, said rotor being connected to a load which may either give or take energy such, for example, as a vehicle wheel 15. The terminal 16 of the primary winding 13 is connected to the left-hand terminal of the source 11 through the low-voltage winding 19 of a transformer 20 having other than a 1 to 1 ratio. In like manner, the terminal 17 of the primary winding 13 is connected to the right-hand terminal of the source 11 through the high-voltage winding 21 of the transformer 20. The terminal 18 of the primary winding 13 is connected to an intermediate point 22 of the source 11 through the tertiary winding 23 of an asynchronous phase-converter 24, said tertiary winding being adapted to produce substantially 87% of the electromotive force of the source 11, whereby a substantially balanced three-phase electromotive force is impressed upon the primary winding 13 by virtue of the well known Scott or T connection. The phase-converter 24 further comprises a primary winding 25 connected across an adjustable portion of the source 11 and a secondary winding 26 in the form of a squirrel-cage or other closed-circuit rotor winding.

The winding 19 of the transformer 20 is reversed with respect to the winding 21 as indicated, whereby the electromotive forces developed in said two windings by the mutual flux are substantially 180° apart in phase, as applied to the system.

Having thus described the arrangement of a system embodying one form of my invention, the operation thereof is as follows. On energizing the source 11 and starting the phase-converter 24 into operation, in any well-known manner, an electromotive force 16—17 is impressed upon the induction motor 12, substantially in phase with that of the source 11. The electromotive force of the tertiary winding 23, in quadrature with the electromotive force of the source 11, produces electromotive forces 16—18 and 18—17 in the motor 12, said electromotive forces being of substantially the same magnitude as the electromotive force 16—17, the delta electromotive force 18—17 leading said directly-supplied electromotive force by substantially 120°, whereas the delta electromotive force 16—18 lags behind said directly-supplied electromotive force by substantially 120°. As the load current of the motor 12 is increased, the ohmic and inductive drops within the converter 24 cause the induced voltage in the tertiary winding 23 to be slightly reduced and to further be slightly retarded in phase, or, if recuperation is being effected from the motor 12 back to the source 11, to produce a slight increase and advance in the phase of said tertiary electromotive force. The effect of the electromotive forces produced in the transformer windings 19 and 21, because of the mutual flux, is to maintain balance of the three-phase electromotive force applied to the points 16, 17 and 18, as will more fully appear by reference to Fig. 2.

Figure 2:
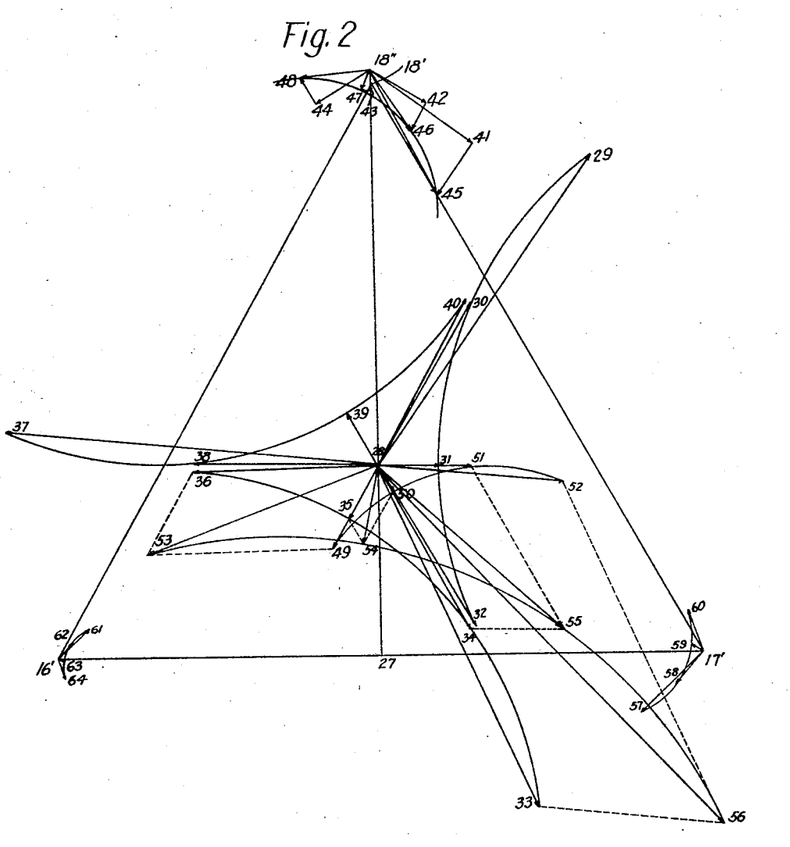
Figs. 2, 4 and 6 are vector diagrams illustrating the operation of the systems of Figs. 1, 3 and 5, respectively.

In the explanatory vector diagram of Fig. 2, the electromotive force applied to the motor 12 under no load is shown as a substantially equi-lateral triangle 16'—17'—18', the vector 16'—17' indicating the electromotive force of the source 11 and the vector 27—18' representing the electromotive force induced in the tertiary winding 23, in quadrature to, and having substantially 87% the magnitude of, the vector 16'—17'. I find, from a careful analysis, that, with a non-synchronous phase-converter, better results are obtained by having the induced electromotive force of the teritary winding 23 slightly exceed 87% of the electromotive force of the source 11, whereby the point 18' assumes a position 18" in Fig. 2 slightly above the apex of an equilateral triangle erected on the vector 16'—17' as a base.

In accordance with the principles of the well known Heyland diagram, the different load currents in each phase of the motor 12 may be represented by vectors having a common terminal and having their remaining terminals lying along the circumference of a semi-circle. Thus the currents supplied to the terminal 18 at 100% overload motoring, at full-load motoring, at no load, and at 100% recuperation, may be represented by vectors 28—29, 28—30, 28—31 and 28—32, respectively, the points 29 to 32, inclusive, lying along the circumference of a circle, as indicated by an arc drawn therethrough. In like manner, the currents supplied to the terminal 17 under the same variations of load, may be indicated by the vectors 28—33 to 28—36, inclusive, and the currents supplied to the terminal 16 may be represented by the vectors 28—37 to 28—40, inclusive.

The effect of the reactance of the phase-converter is to produce reactive drops 18"—41 to 18"—44, inclusive, perpendicular, respectively, to the vectors 28—29 to 28—32, inclusive, and to produce ohmic drops 41—45, 42—46, 43—47 and 44—48, in phase opposition to the vectors 28—29 to 28—32, inclusive. Thus, for the four conditions of load assumed, the point 18″ will assume the appropriate position 45 to 48, inclusive, moving along the corresponding arc, as indicated, and causing the triangle 16′—17′—18″ to be out of balance, as will be apparent. It will be noted that, for motoring conditions, the tertiary electromotive force of the phase-converter assumes positions such as 27—45 and 27—46, being diminished in size and lagging behind the desired quadrature position, whereas, during recuperation, said tertiary electromotive force is slightly larger than is desirable and is also in phase advance of the desired quadrature position.

The effect of the transformer 20 is to produce corresponding movements of the points 16′ and 17′. In determining the phase position of the flux of said transformer, it is necessary to take into account the fact that the winding 19 is reversed in connection, and it will further be assumed that the winding 19 has one-half the turns of the winding 21. Thus the vector 28—49 is one-half the reverse vector 28—40, the vector 28—50 is one-half the reverse vector 28—39, the vector 28—51 is one-half the reverse vector 28—38 and the vector 28—52 is one-half the reverse vector 28—37. The currents in the winding 21 being indicated by the vectors 28—33 to 28—36, inclusive, the phase of the transformer flux under different conditions of load may be obtained by vectorially combining the vectors 28—33 to 28—36, inclusive, with the vectors 28—49 to 28—52, inclusive, respectively, thus producing the vectors 28—53 to 28—56, inclusive. The vectors 17′—57 to 17′—60, inclusive, represent the electromotive forces induced in the winding 21 under the different load conditions and are perpendicular, respectively, to the flux vectors 28—53 to 28—56, inclusive, the points 57 to 60, inclusive, thus representing the resultant positions of the point 17′ under the differing conditions of load.

In like manner, the vectors 16′—61 to 16′—64, inclusive, represent the electromotive forces produced in the coil 19, said vectors also being in quadrature to the flux vectors 28—53 to 28—56, inclusive, but being in phase opposition to the flux corresponding to the vectors 17′—57 to 17′—60, inclusive. Thus, the points 61 to 64, inclusive, represent the different positions of the point 16′, under the different load currents assumed.

It will thus be noted that, at 100% overload, the electromotive force impressed upon the motor 12 may be represented by the triangle 61—45—57, the polyphase electromotive force at full load may be represented by the triangle 62—46—58, the electromotive force at no load by the triangle 63—47—59 and the polyphase electromotive force at full-load recuperation by the triangle 64—48—60. Thus the general effect is that of a pivoting action around the point 16′, said point moving but little, whereas the point 17′ moves through an intermediate distance and the point 18″ through a maximum distance. There is a simultaneous change in the size of the polyphase triangle whereby it remains substantially equilateral.

Figure 3:
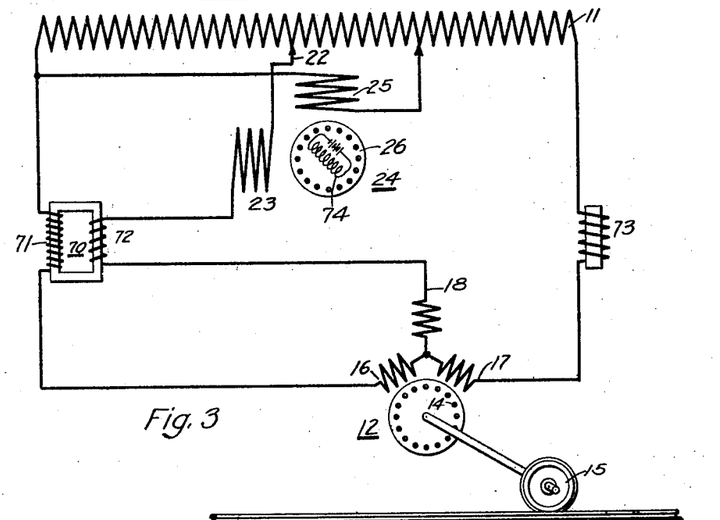

Turning now to the form of my invention shown in Fig. 3, the general arrangement of the system is as shown in Fig. 1 with the exception that the phase-converter is of the synchronous type and a transformer 70 is employed, said transformer having one winding 71 embodying a relatively large number of turns inserted in the lead to the terminal 16 and further having a winding 72 embodying a relatively small number of turns inserted in the lead traversing the tertiary winding 23. Furthermore, a reactance device 73 is inserted in the lead to the terminal 17. Means for producing the direct-current excitation for synchronous operation are indicated at 74.

Figure 4:
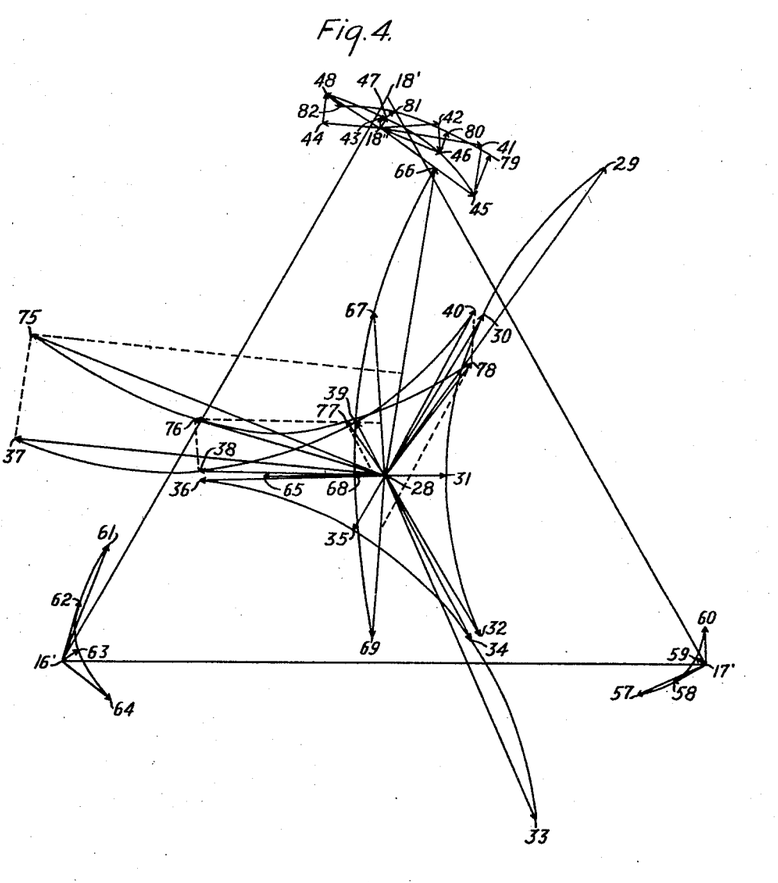

In the systems as shown in Figs. 3 and 4, wherein a synchronous phase-converter is employed, I find that a more nearly perfect balance may be obtained if the point 18′ be assumed to lie at a position 18″ below, and to the left of, the apex of an equilateral triangle erected on the vector 16′—17′ as a base. To produce this effect, the tertiary winding 23 must produce slightly less than 86.6% of the electromotive force of the source 11 and the point 22 must be slightly off the center of said source.

For an explanation of the operation of the system of Fig. 3, reference may be had to Fig. 4 wherein the salient points of the vector diagram are as indicated in Fig. 2. The phase and magnitude of the different line currents being determined and indicated as in the diagram of Fig. 2, the effect of the ohmic and inductive drops in the phase-converter is to tend to cause the point 18″ to travel along the arc 45—46—47—48 as before. It is assumed that the winding 71 has substantially three times as many turns as the winding 72. The effect of the over-excitation of the secondary member of the phase-converter, as by the direct-current winding 74, is to produce leading wattless current which may be represented in phase and in magnitude by a vector 28—65. The watt or energy currents produce drops in all the phase-converter windings. The leading wattless current represented by the vector 28—65 produces drops principally in the primary winding 25 and partially in the secondary windings of the converter 24. On the other hand, the lagging wattless current components of the currents represented by the vectors 28—29 to 28—32, inclusive, produce drops principally in the tertiary winding 23 although also partially in the secondary windings of the phase converter. Thus the equivalent current supplied to the phase-converter for the different conditions of load may be represented by vectors 28—66 to 28—69, inclusive, respectively. The construction of the vector 28—66, for example, in accordance with the above, is obvious, its wattless current component being the algebraic sum of one-half the vector 28—65 and one-half the wattless component of the vector 28—29 and its energy component being the same as that of the vector 24—25. Vectors representing the flux of the transformer 70 are derived by combining one-third of the vectors 28—66 to 28—69, respectively, with the vectors 28—37 to 28—40, inclusive, thus obtaining the flux vectors 28—75 to 28—78, inclusive. The voltage induced by these fluxes in the coil 71 are represented by the vectors 16'—61 to 16'—64, inclusive, said last-named vectors being in quadrature to the respective flux vectors. The electromotive forces induced by the transformer flux in the coil 72 are represented by the vectors 45—79, 46—80, 47—81 and 48—82, respectively, these latter vectors also being in quadrature relation to the appropriate flux vectors and having substantially one-third the magnitude of the appropriate vectors 16'—61 to 16'—64, inclusive. The vectors 17'—57 to 17'—60, inclusive, represent the reactive drop in the inductive device 73 under different conditions of load, and said vectors are, therefore, in quadrature to the current vectors 28—33 to 28—36, inclusive.

It will be noted that the effect of the winding 72 is to hold up the voltage of the tertiary winding 23 under motoring conditions and to hold down said voltage under recuperative conditions, thus reducing the distortion of the polyphase electromotive force triangle. The point 16' moves much more than in the system of Figs. 1 and 2, and the polyphase vector triangle tends to pivot about the point 17' rather than about the point 16'.

Figure 5:
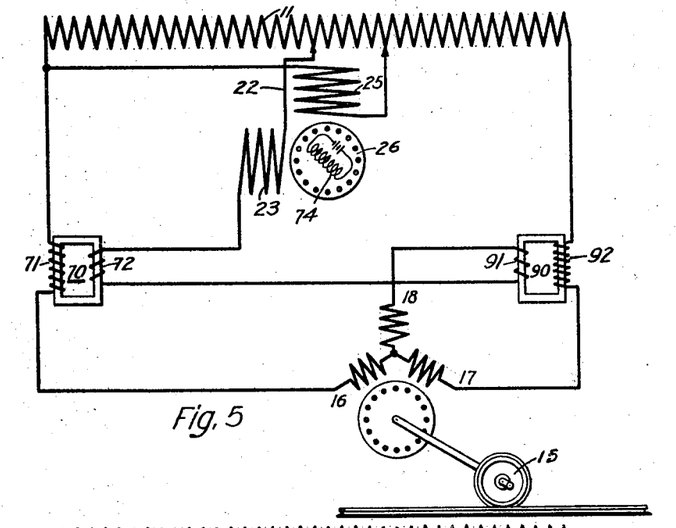

In the system of Fig. 5, the main features are as indicated in Fig. 3, except that a transformer 90 is employed having a winding 91 in series with the tertiary winding 23 and a winding 92 comprising a relatively large number of turns inserted in the lead to the terminal 17. The connections of the winding 91 are reversed, as shown.

Figure 6:
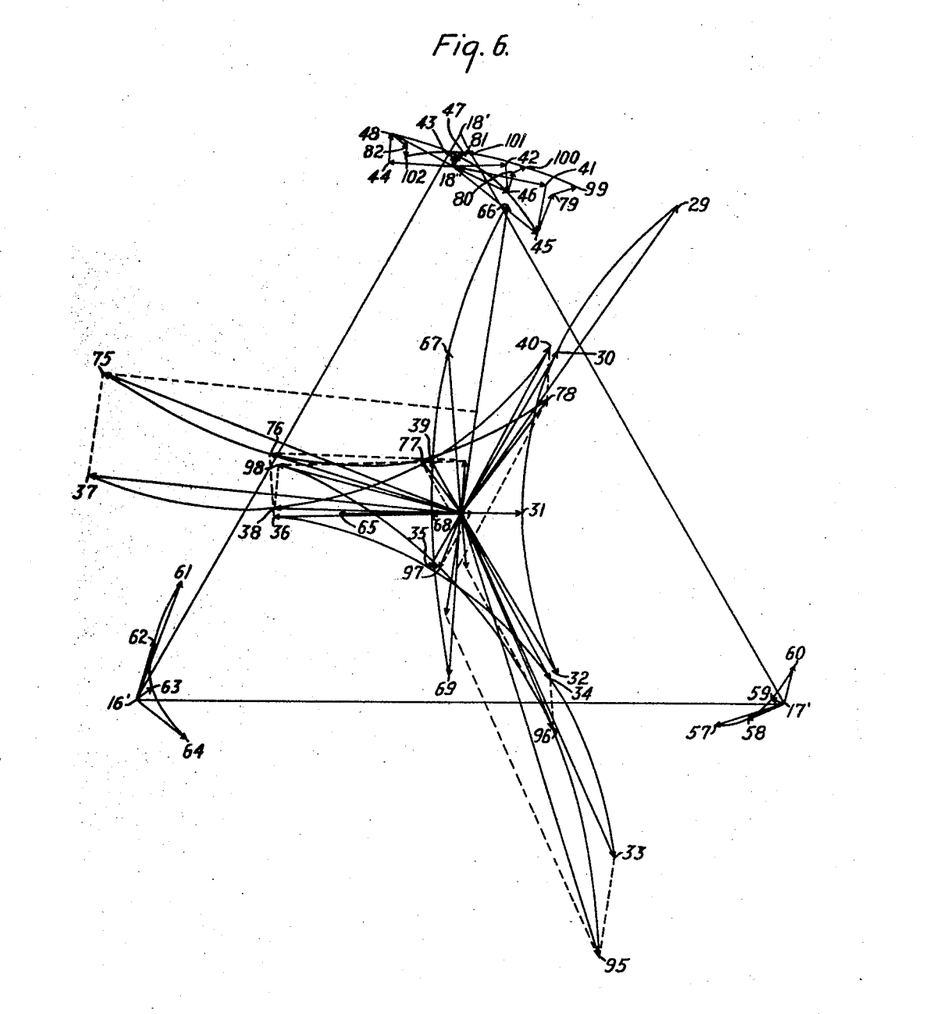

The vector diagram of Fig. 6 is explanatory of the action in the system of Fig. 5 and has corresponding points indicated as in Figs. 2 and 4. It is assumed that the winding 91 has substantially one-third the turns of the winding 92 and that the winding 72 has substantially one-third the turns of the winding 71.

Bearing in mind that the winding 91 is reversed with respect to the winding 92, the flux vectors for the transformer 90 may be obtained by combining one-third of the reverse vectors 28—66 to 28—69, inclusive, obtained as in Fig. 4, with the vectors 28—33 to 28—36, inclusive, respectively. There are thus obtained the flux vectors 28—95 to 28—98, inclusive. The vectors 17'—57 to 17'—60, inclusive, represent the voltage produced in the winding 92 and they are, therefore, at right angles and proportional to the appropriate flux vectors 28—95 to 28—98, inclusive. The coil 91 having one-third the turns of the coil 92, the electromotive forces produced therein may be represented by the vectors 79—99, 80—100, 81—101 and 82—102, respectively, the vectors 45—79 to 48—82 having been determined as in Fig. 4. In like manner, the vectors 16'—61 to 16'—64, inclusive, are as shown in Fig. 4.

It will be noted that the arc of travel of the apex of the polyphase voltage triangle along the path 99—100—101—102 is much more nearly a horizontal straight line than in any of the preceding cases, thus showing that the tertiary voltage may be maintained at a substantially uniform value throughout the load range, altering only in phase.

Figure 7:
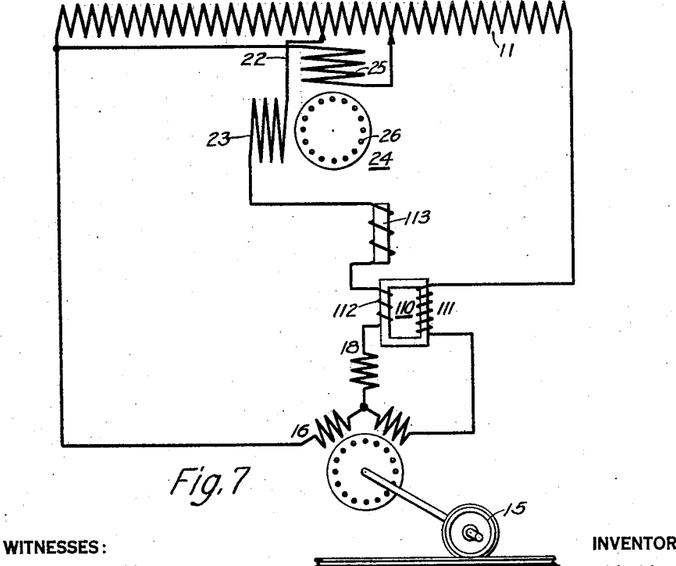

The main operating elements of the system of Fig. 7 are as previously indicated except that a transformer 110 is employed, having a winding comprising a relatively large number of turns 111 inserted in the lead to the terminal 17 and a winding 112 comprising a relatively small number of turns inserted in series with the tertiary winding 23. A reactive device 113 is also included in series with the tertiary winding 23, thus somewhat improving the vector relations. The effect of the device 113 is somewhat different than that of permitting equivalent flux leakage in the transformer 110, in that it affects the B phase more strongly while affecting the A phase somewhat less.

Figure 8:
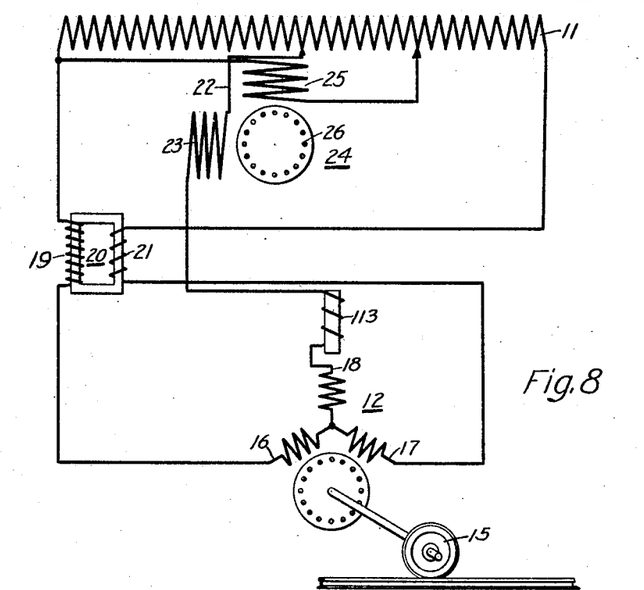

In the system of Fig. 8, a transformer 20 inductively interlinks the leads to the terminals 16 and 17, respectively, the winding 19 comprising a larger number of turns than the winding 21. A reactive device 113 is further included in series with the tertiary winding 23 to further improve the phase relations. It will be noted that the system of Fig. 8 in some respects resembles that of Fig. 1, except that the relative magnitude of the windings 19 and 21 is interchanged and the winding 19 is not reversed in its connections.

Figure 9:
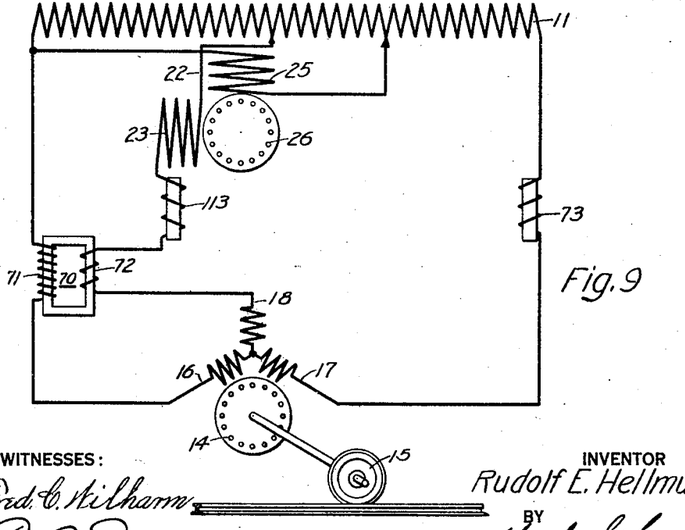

In the system of Fig. 9, a transformer 70 interlinks the lead to the terminal 16 with the circuit of the tertiary winding 23, said circuit further including the reactor 113. The lead to the terminal 17 is also provided with a reactor 73 so that the system of Fig. 9 is substantially that of Fig. 3 except for the reactor 113.

Figure 10:
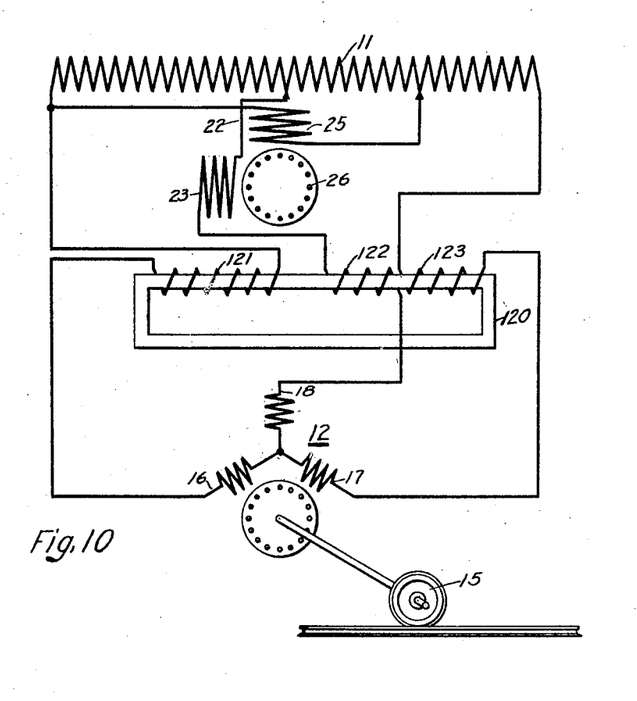

In the system of Fig. 10, a large transformer 120 is provided having three windings 121, 122 and 123, inserted, respectively, in series with the leads to the points 16, 18 and 17. The winding 121 is larger than the winding 123 which, in turn, is larger than the winding 122. The winding 121 is further reversed with respect to the other two windings. By this means, an effectual control of the voltage balance may be maintained.

While I have shown my invention in a plurality of forms, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. In a phase-converter system, the combination with a single-phase circuit, of a polyphase circuit, a dynamo-electric phase-converter connected therebetween for effecting energy transfer from one circuit to the other, and means for developing unequal electromotive forces in two leads of said system having other than a quadrature phase relation to the currents in the respective leads, said auxiliary electromotive forces being of such relative phase that vectors representing them are substantially parallel.

2. In a phase-converter system, the combination with a single-phase circuit, of a polyphase circuit, a dynamo-electric phase-converter connected therebetween for effecting energy transfer from one circuit to the other, and means for developing unequal electromotive forces in two leads of said system having other than a quadrature phase relation to the currents in the respective leads, said auxiliary electromotive forces having a relative phase displacement of 180°.

3. In a phase-converter system, the combination with a single-phase circuit, of a polyphase circuit, a dynamo-electric phase-converter connected therebetween for effecting energy transfer from one circuit to the other, and two mutually interlinked inductive devices of unequal reactance connected in two leads of said system, respectively, the connections being such that the electromotive force of one inductive device, as impressed upon said system, is substantially 180° out of phase with the electromotive force of the other inductive device, as impressed upon said system.

4. In a phase-converter system, the combination with a single-phase circuit, of a polyphase circuit, a phase-converter of the dynamo-electric type connected therebetween for effecting power transfer from one circuit to the other, and means for producing electromotive forces of unequal magnitude, of which the vectors are in substantial alinement in two of the phases of said polyphase circuit, whereby the voltage unbalance caused by the inductive and ohmic drops in said converter may be partially compensated.

5. In a phase-converter system, the combination with a single-phase circuit, of a three-phase circuit, a phase-converter of the dynamo-electric type connected therebetween for aiding in power transfer from one circuit to the other, one delta voltage of said three-phase circuit being substantially in phase with the electromotive force of said single-phase circuit and the remaining two delta voltages of said three-phase circuit being substantially equally displaced in phase from the electromotive force of said single-phase circuit, and mutually interlinked inductive devices of unequal reactance so connected that the electromotive forces induced therein are combined with said two last-named delta electromotive forces, respectively.

6. In a phase-converter system, the combination with a single-phase circuit, of a three-phase circuit, a phase-converter of the dynamo-electric type connected therebetween for aiding in power transfer from one circuit to the other, one delta voltage of said three-phase circuit being substantially in phase with the electromotive force of said single-phase circuit and the remaining two delta voltages of said three-phase circuit being substantially equally displaced in phase from the electromotive force of said single-phase circuit, and mutually interlinked inductive devices of unequal reactance so connected that the electromotive forces induced therein are combined with said two last-named delta electromotive forces, respectively, the larger inductive device being connected to affect the delta electromotive force immediately leading said first-named delta electromotive force.

7. In a phase-converter system, the combination with a single-phase circuit, of a three-phase circuit, a phase-converter of the dynamo-electric type connected therebetween for aiding in power transfer from one circuit to the other, one delta voltage of said three-phase circuit being substantially in phase with the electromotive force of said single-phase circuit and the remaining two delta voltages of said three-phase circuit being substantially equally displaced in phase from the electromotive force of said single-phase circuit, and mutually interlinked inductive devices of unequal reactance so connected that the electromotive forces induced therein are combined with said two last named delta electromotive forces respectively, the larger inductive device being connected to affect the delta electromotive force immediately leading said first-named delta electromotive force, and said two inductive devices being so connected that the electromotive forces developed therein have a mutual phase displacement of substantially 180° as applied in said system.

8. In a phase-converter system, the combination with a single-phase circuit, of a three-phase circuit, a phase-converter of the dynamo-electric type connected therebetween for aiding in power transfer from one circuit to the other, one delta voltage of said three-phase circuit being substantially in phase with the electromotive force of said single-phase circuit and the remaining two delta voltages of said three-phase circuit being substantially equally displaced in phase from the electromotive force of said single-phase circuit, and means for producing and combining auxiliary corrective electromotive forces of unequal size with said two last-named delta voltages to compensate for the ohmic and inductive drops in said phase-converter.

9. In a phase-converter system, the combination with a single-phase circuit, of a three-phase circuit, a phase-converter of the dynamo-electric type connected therebetween for aiding in power transfer from one circuit to the other, one delta voltage of said three-phase circuit being substantially in phase with the electromotive force of said single-phase circuit and the remaining two delta voltages of said three-phase circuit being substantially equally displaced in phase from the electromotive force of said single-phase circuit, and means for producing and combining auxiliary corrective electromotive forces of unequal size with said two last-named delta voltages to compensate for the ohmic and inductive drops in said phase-converter, the corrective electromotive force which is combined with the delta electromotive force immediately leading said first named delta electromotive force in phase being greater than the electromotive force which is combined with the delta electromotive force immediately following said first-named delta electromotive force.

10. In a phase-converter system, the combination with a single-phase circuit, of a three-phase circuit, a phase-converter of the dynamo-electric type connected therebetween for aiding in power transfer from one circuit to the other, one delta voltage of said three-phase circuit being substantially in phase with the electromotive force of said single-phase circuit and the remaining two delta voltages of said three-phase circuit being substantially equally displaced in phase from the electromotive force of said single-phase circuit, and means for producing and combining auxiliary corrective electromotive forces of unequal size with said two last-named delta voltages to compensate for the ohmic and inductive drops in said phase-converter, said corrective electromotive forces being substantially 180° apart in phase, as applied to said system, and the corrective electromotive force immediately leading said first-named delta electromotive force in phase being greater than the electromotive force which is combined with the delta electromotive force immediately following said first-named delta electromotive force.

11. In a system of distribution wherein a polyphase circuit is connected to a single-phase source through a dynamo-electric phase-converter, the method of compensating for voltage unbalance in the polyphase circuit caused by the ohmic and inductive drops in said phase-converter which comprises developing electromotive forces in the mains of said system, the electromotive forces in at least two of said mains being of unequal magnitude and of opposite phase relation.

12. In a system of distribution wherein a polyphase circuit is connected to a single-phase source through a dynamo-electric, phase-converter, the method of compensating for voltage unbalance in the polyphase circuit caused by the ohmic and inductive drops in said phase converter which comprises developing electromotive forces in the mains of said polyphase circuit, the electromotive forces in at least two of said mains being of unequal magnitude and of opposite phase relation.

13. In a system of distribution wherein a polyphase circuit is connected to a single-phase source through a dynamo-electric, phase-converter, the method of compensating for voltage unbalance in the polyphase circuit caused by the ohmic and inductive drops in said phase-converter which comprises developing electromotive forces in the mains of said polyphase circuit, the electromotive forces in at least two of said mains being of unequal magnitude and having other than a quadrature relation to the currents in the respective mains.

In testimony whereof, I have hereunto subscribed my name this 30th day of July, 1917.

RUDOLF E. HELLMUND.